United States Patent
Bergman et al.

(10) Patent No.: US 10,070,459 B2
(45) Date of Patent: Sep. 4, 2018

(54) RECEPTION OF SIMULTANEOUS DOWNLINK TRANSMISSIONS BY A LOW COMPLEXITY USER EQUIPMENT

(71) Applicant: Telefonaktiebolaget LM Ericsson (publ), Stockholm (SE)

(72) Inventors: Johan Bergman, Stockholm (SE); Erik Eriksson, Linköping (SE); Håkan Palm, Växjö (SE); Emre Yavuz, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 103 days.

(21) Appl. No.: 15/033,494

(22) PCT Filed: Apr. 11, 2014

(86) PCT No.: PCT/SE2014/050452
§ 371 (c)(1),
(2) Date: Apr. 29, 2016

(87) PCT Pub. No.: WO2015/065261
PCT Pub. Date: May 7, 2015

(65) Prior Publication Data
US 2016/0255646 A1 Sep. 1, 2016

Related U.S. Application Data

(60) Provisional application No. 61/898,724, filed on Nov. 1, 2013.

(51) Int. Cl.
*H04W 72/12* (2009.01)
*H04W 4/70* (2018.01)
(Continued)

(52) U.S. Cl.
CPC ........ *H04W 72/1273* (2013.01); *H04W 4/70* (2018.02); *H04W 72/1215* (2013.01);
(Continued)

(58) Field of Classification Search
None
See application file for complete search history.

(56) References Cited

U.S. PATENT DOCUMENTS

2013/0136090 A1* 5/2013 Liu ................. H04L 1/0002
370/329
2013/0242729 A1* 9/2013 Chen ............. H04W 28/0289
370/230

(Continued)

OTHER PUBLICATIONS

3GPP, "3rd Generation Partnership Project; Technical Specification Group Radio Access Network; Evolved Universal Terrestrial Radio Access (E-UTRA); Services provided by the physical layer (Release 11)", 3GPP TS 36.302 V11.4.0, Sep. 2013, 1-21.

(Continued)

*Primary Examiner* — Anh Ngoc Nguyen
(74) *Attorney, Agent, or Firm* — Patent Portfolio Builders, PLLC

(57) ABSTRACT

A low complexity user equipment (40) includes maximum size restriction, such as a maximum transport block size, for simultaneous downlink transmissions. When the user equipment (40) receives simultaneous downlink transmission exceeding the maximum size restriction, the user equipment (40) is allowed to skip decoding of one or more of the downlink transmission (e.g., one or more transport blocks) according to a predetermined set of rules.

18 Claims, 9 Drawing Sheets

(52) U.S. Cl.
CPC ... *H04W 72/1247* (2013.01); *H04W 72/1257* (2013.01); *H04W 72/1289* (2013.01)

(56) References Cited

U.S. PATENT DOCUMENTS

2014/0036865 A1* 2/2014 Camarda ............... H04L 5/0007
370/330
2014/0307690 A1* 10/2014 Kim ..................... H04B 7/2656
370/329

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.
3GPP, "3rd Generation Partnership Project; Technical Specification Group Radio Access Network; Evolved Universal Terrestrial Radio Access (E-UTRA); User Equipment (UE) radio access capabilities (Release 11)", 3GPP TS 36.306 V11.4.0, Sep. 2013, 1-27.
3GPP, "3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0, Jun. 2013, 1-55.
Unknown, Author, "Low complexity MTC UE", 3GPP TSG-RAN WG1 Meeting #74, R1-133419, Ericsson, Barcelona, Spain, Aug. 19-23, 2013, 1-3.
Unknown, Author, "New WI: Low cost & enhanced coverage MTC UE for LTE—Core Part", 3GPP TSG RAN meeting #60, RP-130848, Vodafone, Oranjestad, Aruba, Jun. 10-14, 2013, 1-7.
Unknown, Author, "New WI: Low cost & enhanced coverage MTC UE for LTE—Feature part", 3GPP TSG RAN meeting #60, RP-130848, Vodafone, Oranjestad, Aruba, Jun. 10-14, 2013, 1-5.
Unknown, Author, "New WI: Low cost & enhanced coverage MTC UE for LTE—Performance Part", 3GPP TSG RAN meeting #60, RP-130848, Vodafone, Oranjestad, Aruba, Jun. 10-14, 2013, 1-5.
Unknown, Author, "On mobility support for Low Complexity MTC UEs and MTC coverage enhancement", 3GPP TSG-RAN WG1 #74bis, R1-134959, RAN1, Guangzhou, China, Oct. 7-11, 2013, 1-2.
Unknown, Author, "Remaining details of low cost MTC UE", 3GPP TSG RAN WG1 Meeting #74bis, R1-134646, Ericsson, Guangzhou, China, Oct. 7-11, 2013, 1-3.
Unknown, Author, "SIB delivery for low-complexity MTC UE", 3GPP TSG RAN WG1 #74bis, R1-134484, Sony, Guangzhou, China, Oct. 7-11, 2013, 1-4.

* cited by examiner

RECEPTION OF SIMULTANEOUS DOWNLINK TRANSMISSIONS BY A LOW COMPLEXITY USER EQUIPMENT

TECHNICAL FIELD

The present disclosure relates generally to low complexity user equipment and, more particularly, to reception of simultaneous downlink transmissions by a low complexity user equipment.

BACKGROUND

There is an ongoing work item by the Third Generation Partnership Project (3GPP) for the introduction of a low complexity, low cost user equipment (UE) type for machine type communications (MTC) in Long Term Evolution (LTE) Release 12 (Rel-12). One of the complexity reduction techniques to be specified is a restriction of the maximum transport block size (TBS) to 1000 bits. This restriction is significantly lower than the maximum TBS that can be handled by existing UE categories in LTE. The lower maximum TBS requires less processing and buffering in the UE and allows for a less complex and less costly UE design.

The Third Generation Partnership Project (3GPP) specification TS 36.302, "Services provided by the physical layer", V11.4.0 (2013-09) describes services provided by the physical layer in LTE. An LTE UE is required to be able to receive simultaneous transmissions on parallel physical channels according to the downlink reception types specified in TS 36.302, V11.4.0, Table 8.2-1 and the downlink reception type combinations specified in TS 36.302, V11.4.0, Table 8.2-2. For example, according to the tables, an LTE UE in Radio Resource Control (RRC) idle mode needs to be able to receive the broadcast channel (BCH), paging channel (PCH) and system information transmitted on the downlink shared channel (DL-SCH) in parallel. The DL-SCH is scheduled with a System Information (SI) Radio Network Temporary Identifier (SI-RNTI). An LTE UE in RRC connected mode needs to be able to receive the BCH, system information transmitted on the DL-SCH, and user data transmitted on DL-SCH. The DL-SCH is scheduled, for example, with a Cell-RNTI (C-RNTI).

If the same requirements were applied to a low complexity UE supporting a maximum TBS of 1000 bits, then either the total required buffering needs would become significantly larger than what would be required to support 1000 bits of user data, or the 1000 bits have to be shared between user data and other transmissions, which would mean a significant reduction of user data rate. For example, system information transmitted on DL-SCH with downlink control information (DCI) format 1A can amount to 2216 bits.

SUMMARY

In exemplary embodiments of the disclosure, the maximum TBS for a low complexity UE is taken into account when deciding the UE behavior during simultaneous transmission in parallel on different physical channels to the UE. If the sum of the transport block sizes of the involved transport blocks exceeds the maximum TBS, the UE is allowed to skip decoding of one or more of the involved transport blocks according to a predetermined set of rules.

Exemplary embodiments of the disclosure comprise methods implemented by a user equipment of receiving simultaneous downlink transmission. In one exemplary embodiment, the user equipment receives scheduling information for a set of simultaneous downlink transmissions. The scheduling information comprises a transport block size for each downlink transmission in said set of simultaneous downlink transmissions. The method further comprises determining whether a total transport block size of the downlink transmissions in the set exceeds a total transport block size threshold. If the total transport block size of the downlink transmissions in the set exceeds the total transport block size threshold, the user equipment decodes a subset of transport blocks in the set of downlink transmissions selected according to a set of rules.

In some embodiments, decoding a subset of the transport blocks comprises decoding a subset of transport blocks selected according to their priority as defined by a set of prioritization rules In some embodiments, the method of further comprises determining a priority of a first one of the downlink transmissions in the set depending on the type of the downlink transmission. The type of the first downlink transmission may be determined, for example, based on the radio network temporary identifier associated with the first downlink transmission. In some embodiments, the user equipment may determine that the first downlink transmission has a first priority level if the first downlink transmission contains a system information message, and that the first downlink transmission has a second priority level if the first downlink transmission contains a terminal specific information message.

In some embodiments, the method further comprises determining a priority of a first one of the downlink transmissions in the set depending on scheduling information. In one embodiment, the user equipment determines a system information scheduling window during which the first downlink transmission is scheduled, and then determines a priority level of the first downlink transmission depending on the system information scheduling window.

In some embodiments, the method further comprises receiving an indication that a first downlink transmission in the set contains system information, and determining a priority of the first downlink transmission depending on whether the system information has changed.

In some embodiments, the method of further comprises determining the total transport block size threshold based on the number of the simultaneous downlink transmissions to the user equipment.

Other embodiments of the disclosure comprise a user equipment configured to receive simultaneous downlink transmissions from a radio base station. In one exemplary embodiment, the user equipment is configured to receive scheduling information for a set of simultaneous downlink transmissions. The scheduling information comprises a transport block size for each downlink transmission. The user equipment is further configured to determine whether a total transport block size of the downlink transmissions in the set exceeds a total transport block size threshold and, if the total transport block size of the downlink transmissions in the set exceeds the total transport block size threshold, to decode a subset of transport blocks in the set of downlink transmissions selected according to a set of rules.

In some embodiments, the processing circuit is configured to decode a subset of transport blocks selected according to their priority as defined by the set of prioritization rules.

In some embodiments, the user equipment is further configured to determine a priority of a first one of the downlink transmissions in the set depending on the type of the downlink transmission. The user equipment may, for example, be configured to determine the message type of the first downlink transmissions based on radio network temporary identifier associated with the first downlink transmission. In some embodiments, the user equipment may be configured to determine a first priority level for the downlink transmission if the first downlink transmission contains system information message, and to determine a second priority level for the first downlink transmission if the first downlink transmission contains terminal-specific information messages.

In some embodiments, the user equipment is further configured to determine a priority of a first downlink transmission in the set depending on scheduling information. For example, the user equipment may be configured to determine a system information scheduling window during which the first downlink transmission is scheduled, and then determine a priority level of the first downlink transmission depending on the system information scheduling window.

In some embodiments, the user equipment is further configured to receive an indication that a first downlink transmission in the set contains system information, and to determine a priority of the first downlink transmission depending on whether the system information has changed.

In some embodiments, the user equipment is further configured to determine the total transport block size threshold based on the number of the simultaneous downlink transmissions.

In some embodiments, the user equipment comprises a transceiver for communicating with one or more radio base stations in the wireless communication network, and a processing circuit operatively connected to the transceiver. The processing circuit is configured to receive scheduling information for a set of simultaneous downlink transmissions. The scheduling information comprises a transport block size for each downlink transmission. The processing circuit is further configured to determine whether the total transport block size of the downlink transmissions in the set exceeds a total transport block size threshold, and if the total transport block size of the downlink transmissions in the set exceeds the total transport block size threshold, decode a subset of transport blocks in the set of downlink transmissions selected according to a set of rules.

In some embodiments, the processing circuit is configured to decode a subset of transport blocks selected according to their priority as defined by the set of prioritization rules.

In some embodiments, the processing circuit is further configured to determine a priority of a first one of the downlink transmissions in the set depending on the type of the downlink transmission. The processing circuit may, for example, be configured to determine the message type of the first downlink transmissions based on radio network temporary identifier associated with the first downlink transmission. In some embodiments, the processing circuit may be configured to determine a first priority level for the downlink transmission if the first downlink transmission contains system information message, and to determine a second priority level for the first downlink transmission if the first downlink transmission contains terminal-specific information messages.

In some embodiments, the processing circuit is further configured to determine a priority of a first downlink transmission in the set depending on scheduling information. For example, the processing circuit may be configured to determine a system information scheduling window during which the first downlink transmission is scheduled, and then determine a priority level of the first downlink transmission depending on the system information scheduling window.

In some embodiments, the processing circuit is further configured to receive an indication that a first downlink transmission in the set contains system information, and to determine a priority of the first downlink transmission depending on whether the system information has changed.

In some embodiments, the processing circuit is further configured to determine the total transport block size threshold based on the number of the simultaneous downlink transmissions.

Other embodiments of the disclosure comprise methods implemented in a network node, such as a radio base station, for transmitting data to a user equipment. In one embodiment, the method comprises determining whether a set of simultaneous downlink transmissions to the user equipment exceeds a total transport block size threshold for the user equipment; and if a total transport block size restriction applies, scheduling a set of simultaneous downlink transmissions selected based on a set of rules to avoid exceeding the total transport block size restriction.

In some embodiments, scheduling (220) a set of simultaneous downlink transmissions selected based on a set of rules to avoid exceeding the total transport block size restriction comprises determining a set of prioritization rules for the user equipment, and scheduling the set of simultaneous downlink transmissions based on the determined prioritization rules for the user equipment.

In some embodiments, the method further comprises receiving the set of prioritization rules from one of the user equipment or another network node.

In some embodiments, the determining and scheduling are performed depending on an importance of the downlink transmissions.

Other embodiments of the disclosure comprise a network node, such as a radio base station, configured to transmit data to a user equipment. In one embodiment, the base station is configured to determine whether a total transport block size restriction for simultaneous downlink transmissions applies to the user equipment; and if a total transport block size restriction applies, schedule a set of simultaneous downlink transmissions selected based on a set of rules to avoid exceeding the total transport block size restriction.

In some embodiments, to schedule a set of simultaneous downlink transmissions scheduling, the radio base station is configured to determine a set of prioritization rules for the user equipment; and schedule the set of simultaneous downlink transmissions based on the determined prioritization rules for the user equipment.

In some embodiments, the radio base station is further configured to receive the set of prioritization rules from one of the user equipment or another network node In some embodiments, the radio base station is configured to perform the determining and scheduling depending on an importance of the downlink transmissions The disclosure provides a method and apparatus that allows simultaneous transmission in parallel on different physical channels, giving the network similar flexibility as for normal complexity UEs, while still respecting the limited capabilities of a low complexity UE. This allows the low-complexity UEs to be designed with limited buffering and processing capabilities while still be able to operate in LTE networks.

DETAILED DESCRIPTION

Figure 1:
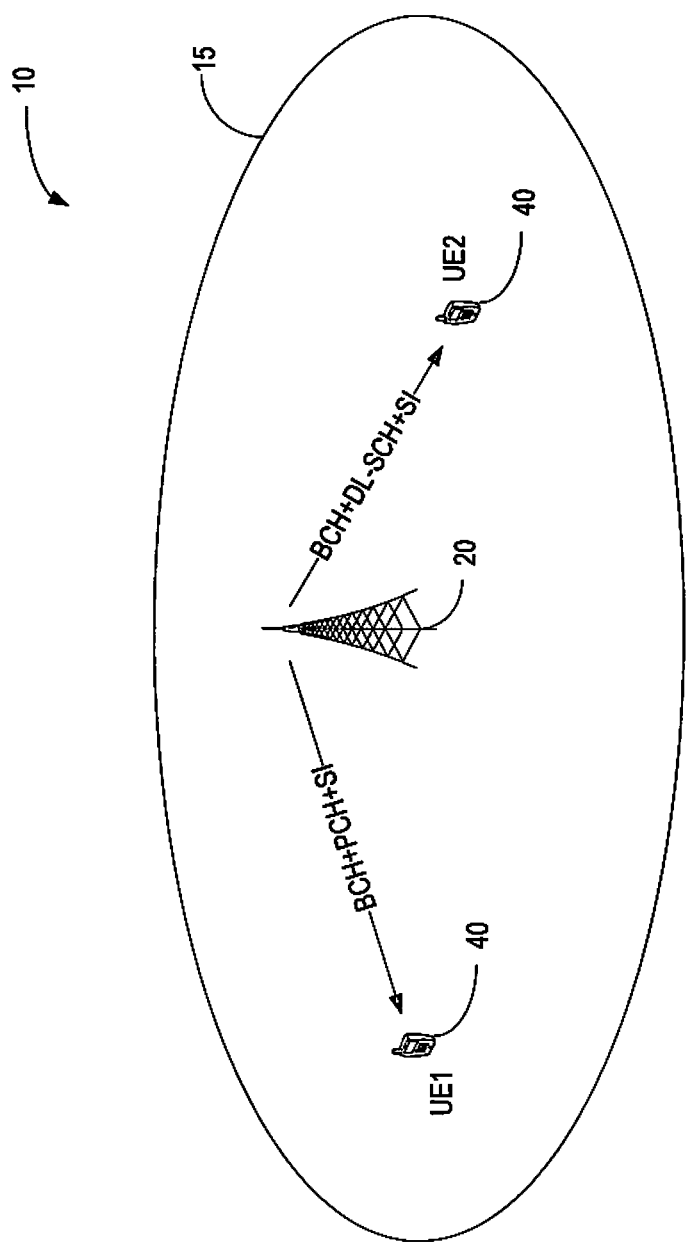
FIG. 1 illustrates a wireless communication network including a low-complexity UE receiving simultaneous downlink transmissions from a radio base stations (RBS)

FIG. 1 illustrates an exemplary wireless communication network indicated generally by the numeral 10. The wireless communication network 10 comprises one or more cells 15; however only one cell 15 is shown in FIG. 1. Each cell 15 is served by an access node, such as a RBS 20, that communicates with UE 40 within the cell 15. For illustrative purposes, an exemplary embodiment is described in the context of a wireless communication network 10 operating according to the Third Generation Partnership Project (3GPP) Long Term Evolution (LTE) Release 12 Standard. Those skilled in the art will appreciate, however, that the present disclosure is more generally applicable to wireless communication networks operating to other standards, including Wideband Code Division Multiple Access (VVCDMA) networks and Worldwide Interoperability for Microwave Access (WIMAX) networks.

In LTE, downlink transmissions from the RBS 20 to the UE 40 are formatted into transport blocks (TBs), each of which is identified by a radio network temporary identifier (RNTI). In the absence of spatial multiplexing, each downlink transmission on a physical channel comprises a single transport block of variable size. In the case of spatial multiplexing, a downlink transmission may comprise two or more transport blocks. The system may specify a maximum transport block size (TBS), e.g., 1000 bits, for each transport block. A conventional UE 40 is required to receive simultaneous transmissions on parallel physical channels according to the downlink reception type specified in 3GPP TS 36.302, V11.4.0, Table 8.2-1 and the downlink reception type combinations specified in 3GPP TS 36.302, V11.4.0, Table 8.2-2. For convenience, these tables are shown below.

TABLE 1

Downlink Reception Types (from TS 36.302 Table 8.2-1)

| "Reception Type" | Physical Channel(s) | Monitored RNTI | Associated Transport Channel |
|---|---|---|---|
| A | PBCH | N/A | BCH |
| B | PDCCH + PDSCH | SI-RNTI | DL-SCH |
| C | PDCCH + PDSCH | P-RNTI | PCH |
| D | PDCCH + PDSCH | RA-RNTI (Note 3) | DL-SCH |
|  |  | Temporary C-RNTI (Note 3) (Note 4) | DL-SCH |

TABLE 1-continued

Downlink Reception Types (from TS 36.302 Table 8.2-1)

| "Reception Type" | Physical Channel(s) | Monitored RNTI | Associated Transport Channel |
|---|---|---|---|
|  | (PDCCH/EPDCCH) + PDSCH | C-RNTI and Semi-Persistent Scheduling C-RNTI | DL-SCH |
| D1 | (PDCCH/EPDCCH) + PDSCH (Note 9) | C-RNTI | DL-SCH |
| E | PDCCH/EPDCCH (Note 1) | C-RNTI | N/A |
| F | PDCCH | Temporary C-RNTI (Note 5) | UL-SCH |
|  | PDCCH/EPDCCH | C-RNTI and Semi-Persistent Scheduling C-RNTI | UL-SCH |
| F1 | PDCCH/EPDCCH (Note 9) | C-RNTI | UL-SCH |
| G | PDCCH | TPC-PUCCH-RNTI | N/A |
| H | PDCCH | TPC-PUSCH-RNTI | N/A |
| I | PDCCH/EPDCCH | Semi-Persistent Scheduling C-RNTI (Note 6) | N/A |
| J | PDCCH/EPDCCH | Semi-Persistent Scheduling C-RNTI (Note 7) | N/A |
| K | PDCCH | M-RNTI (Note 8) | N/A |
| L | PMCH | N/A (Note 8) | MCH |

(Note 1)
PDCCH or EPDCCH is used to convey PDCCH order for Random Access.

Note 2:
Void.

(Note 3)
RA-RNTI and Temporary C-RNTI are mutually exclusive and only applicable during Random Access procedure.

(Note 4)
Temporary C-RNTI is only applicable when no valid C-RNTI is available.

(Note 5)
Temporary C-RNTI is only applicable during contention-based Random Access procedure.

(Note 6)
Semi-Persistent Scheduling C-RNTI is used for DL Semi-Persistent Scheduling release.

(Note 7)
Semi-Persistent Scheduling C-RNTI is used for UL Semi-Persistent Scheduling release.

(Note 8)
In MBSFN subframes only (Note 9)
DL-SCH reception corresponding to D1, and UL-SCH transmission corresponding to F1, are only applicable to SCells.

TABLE 2

Downlink Reception Type Combinations (from TS 36.302 Table 8.2-2)

| Combination | Mandatory/Optional | Comment |
|---|---|---|
| 1 × A + 1 × B + 1 × C | Mandatory | RRC_IDLE |
| 1 × K + 1 × L | Mandatory for MBMS UEs | RRC_IDLE |
| 1 × A + 1 × B + 1 × (D or (1 − m) × E or G or I) + (p − 1 − m) × D1 + m × E + 1 × (F or H or J) + (q − 1) × F1 | Mandatory. (NOTE 3) | RRC_CONNECTED |
| 1 × A + 1 × B + 1 × (D or (1 − m) × E or G or I) + 1 × (F or H or J) + 1 × F + (p − 1 − m) × D1 + m × E + 2 × (q − 1) × F1 | Mandatory for UEs supporting FS2. (NOTE 3) (NOTE 4) | RRC_CONNECTED (NOTE 1) |
| ((1 × ((1 − m) × E or G or I) + 1 × L) or 1 × D) + 1 × (F or H or J) + r × K + (p − 1 − m) × D1 + m × E + (q − 1) × F1 + (r − 1) × L | Mandatory for MBMS UEs. (NOTE 3) (NOTE 4) | RRC_CONNECTED (NOTE 2) |
| ((1 × ((1 − m) × E or | Mandatory for | RRC_CONNECTED |

TABLE 2-continued

Downlink Reception Type Combinations
(from TS 36.302 Table 8.2-2)

| Combination | Mandatory/ Optional | Comment |
|---|---|---|
| I) + 1 × L) or 1 × D) + 1 × (F or H or J) + 1 × F + r × K + (p − 1 − m) × D1 + m × E + 2 × (q − 1) × F1 + (r − 1) × L | MBMS UEs supporting FS2. (NOTE 3) | (NOTE 1) (NOTE 2) |
| 1 × A + 1 × B + 1 × C + 1 × (D or (1 − m) × E or G or I) + (p − 1 − m) × D1 + m × E + 1 × (F or H or J) + (q − 1) × F1 | Mandatory for ETWS and CMAS UEs Optional for all other UEs. (NOTE 3) | RRC_CONNECTED |
| 1 × A + 1 × B + 1 × C + 1 × (D or (1 − m) × E or G or I) + 1 × (F or H or J) + 1 × F + (p − 1 − m) × D1 + m × E + 2 × (q − 1) × F1 | Mandatory for ETWS and CMAS UEs supporting FS2 Optional for all other UEs. (NOTE 3) | RRC_CONNECTED (NOTE 1) |

(NOTE 1)
For TDD UL/DL configuration 0, two PDCCHs or EPDCCHs can be received in the same subframe for UL-SCH in two different uplink subframes.
(NOTE 2)
The combination is the requirement when MBMS reception is on PCell and/or any other cell. r is the number of DL CCs on which the UE supports MBMS reception according to the MBMSInterestIndication.
NOTE:
p is the number of DL CCs supported by the UE. q is the number of UL CCs supported by the UE. q = p = 1 implies non-CA capable UE. m = 0 or 1 for UE supporting multiple TAGs, otherwise m = 0.
NOTE:
The UE is only required to receive one PDSCH, pertaining to D or D1, per DL CC.
(NOTE 3)
Combination involving EPDCCH is optional and required only for UE supporting EPDCCH.
(NOTE 4)
It is not required to simultaneously receive EPDCCH and PMCH on the same cell.

FIG. 1 illustrates a first UE 40, denoted UE1 operating in Radio Resource Control (RRC) idle mode and a second UE 40, denoted UE2, operating in RRC connected mode. From the tables it can be noted that UE1 in RRC idle mode is required, for example, to be able to simultaneously receive the BCH, system information on the DL-SCH (scheduled with a SI-RNTI) and the PCH (i.e., combination A+B+C). UE2 in RRC connected mode is, for example, required to be able to simultaneously receive the BCH, system information on the DL-SCH (scheduled with an SI-RNTI) and user data on the DL-SCH (i.e., combination A+B+D). It is assumed in this exemplary embodiment that UE1 and UE2 are a low complexity UEs 40 with limited memory and processing capabilities. One example of a low complexity UE 40 is a machine type communication (MTC) device.

A low complexity UE 40 is required to be able to receive parallel transmissions of simultaneous physical channels similarly as other UEs 40, as specified in TS 36.302, V11.4.0. As used herein, the term simultaneous is used to mean transmissions occurring at approximately the same time, e.g., during the same transmission time interval or the same scheduling interval. However, a total size restriction may be imposed on the total size of all transport blocks to be transmitted to the UE 40 simultaneously on the downlink. For example, the total sum of all simultaneously received transport blocks (TBs) for a low complexity UE 40, referred to herein as the total TBS restriction, may be restricted to the same value as the maximum TBS, e.g., 1000 bits. If the total sum of simultaneously received TBs exceeds the total TBS restriction, e.g., 1000 bits, the UE 40 is allowed to skip decoding of one or more transport blocks.

According to the present disclosure, when a low complexity UE 40 with a low total TBS restriction (e.g. maximum of 1000 bits) is scheduled with several simultaneous transmissions on parallel physical channels, the UE 40 will share this total transport block size among different downlink reception types within a downlink reception type combination. If the sum of the transport blocks sizes for the involved transport blocks is within the TBS restriction, the UE 40 will decode all involved transport blocks. For example, the sum for a user data transmission of 900 bits plus a system information transmission of 40 bits is 940 bits, which would be within a TBS restriction of 1000 bits. However, if the sum of the transport blocks sizes for the involved transport blocks exceeds the TBS restriction, the UE 40 may not decode all transport blocks. In this case, the UE 40 may skip one or more of the transport blocks and only decode a subset of the transport blocks, the sum of the transport block sizes corresponding to this subset not exceeding the TBS restriction.

The UE 40 follows a set of rules when deciding what transport block(s) to drop. In one embodiment, transmissions associated with different radio network temporary indicators (RNTIs) are given different priority. For example, C-RNTI could be given lower priority than SI-RNTI—this would mean that decoding of user data scheduled with the UE 40-specific C-RNTI would be given lower priority than decoding of system information scheduled with SI-RNTI. Also, a UE 40 in idle mode may give higher priority to downlink transmissions related to random access (RA) (scheduled with an RA-RNTI) and paging (P) (scheduled with a P-RNTI)

In one embodiment, all RNTIs monitored by the UE 40 are given a priority value indicating its priority relative to the other RNTIs monitored by the UE 40. The priority value is used to determine which transmissions to decode when decoding all transmissions is not possible due to the TBS restriction of the UE 40.

In some embodiments of the disclosure, the priority also depends on what system information scheduling window the subframe belongs to. The priority can also depend on whether the UE 40 expects the system information scheduled within this window to have changed.

In one embodiment of the disclosure, different TBS restrictions may apply for a single transmission and the sum of all transmissions. For example the UE 40 may support 1000 bits if only a single transmission is decoded but only a total of 976 bits if two transmissions are decoded.

Figure 2:
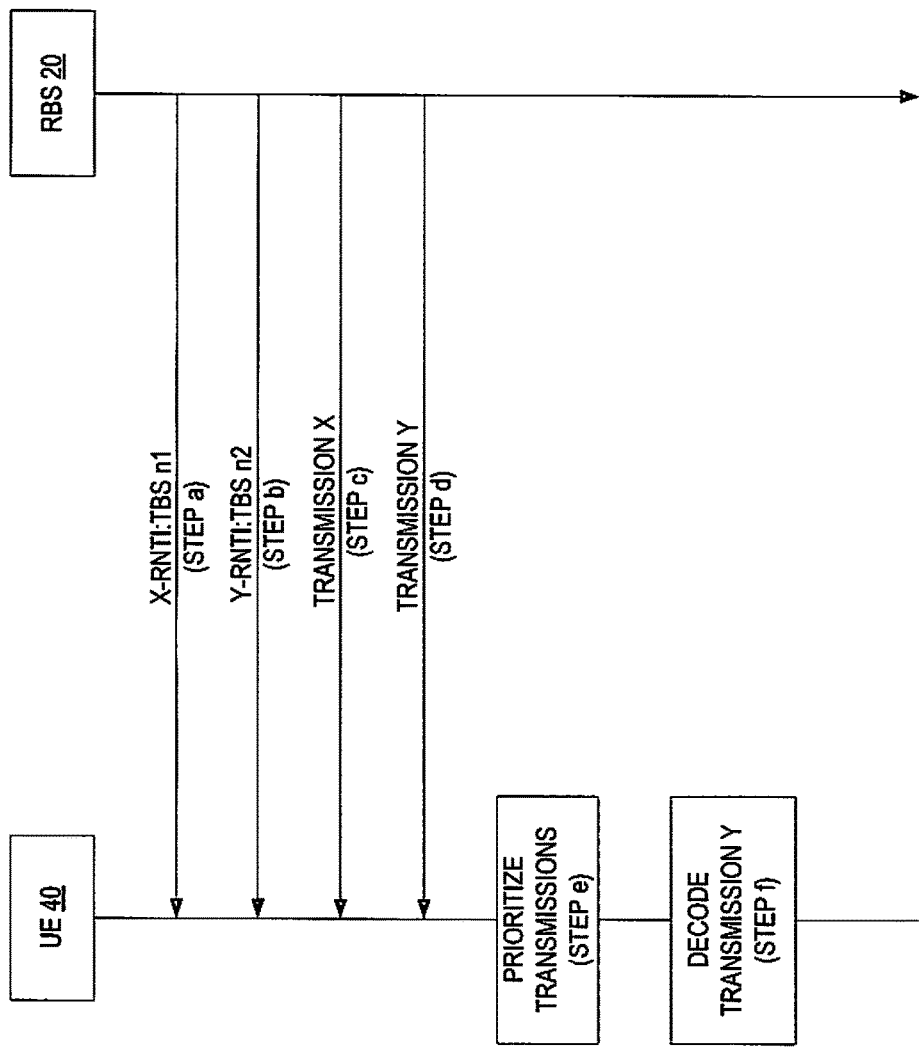
FIG. 2 illustrates simultaneous downlink transmissions from a RBS to a low-complexity UE.

FIG. 2 illustrates simultaneous downlink transmissions from a RBS 20, such as an Evolved NodeB (eNode B), to a low complexity UE 40. At steps a and b, the UE 40 receives scheduling information for two transmissions from the RBS 20. The transmissions are denoted as Transmission X and Transmission Y. The scheduling information includes the RNTI and TBS for each transmission. At steps c and d, the UE 40 receives Transmissions X and Y from the RBS 20. At step e, the UE 40 determines that the total TBS restriction is exceeded and prioritizes the transmissions. Those skilled in the art will appreciate, however that the priority of the downlink transmissions may also be determined prior to the actual transmissions. In this example, Transmission Y is the higher priority transmission. At step f, the UE 40 decodes Transmission Y, which is the higher priority transmission.

Figure 3:
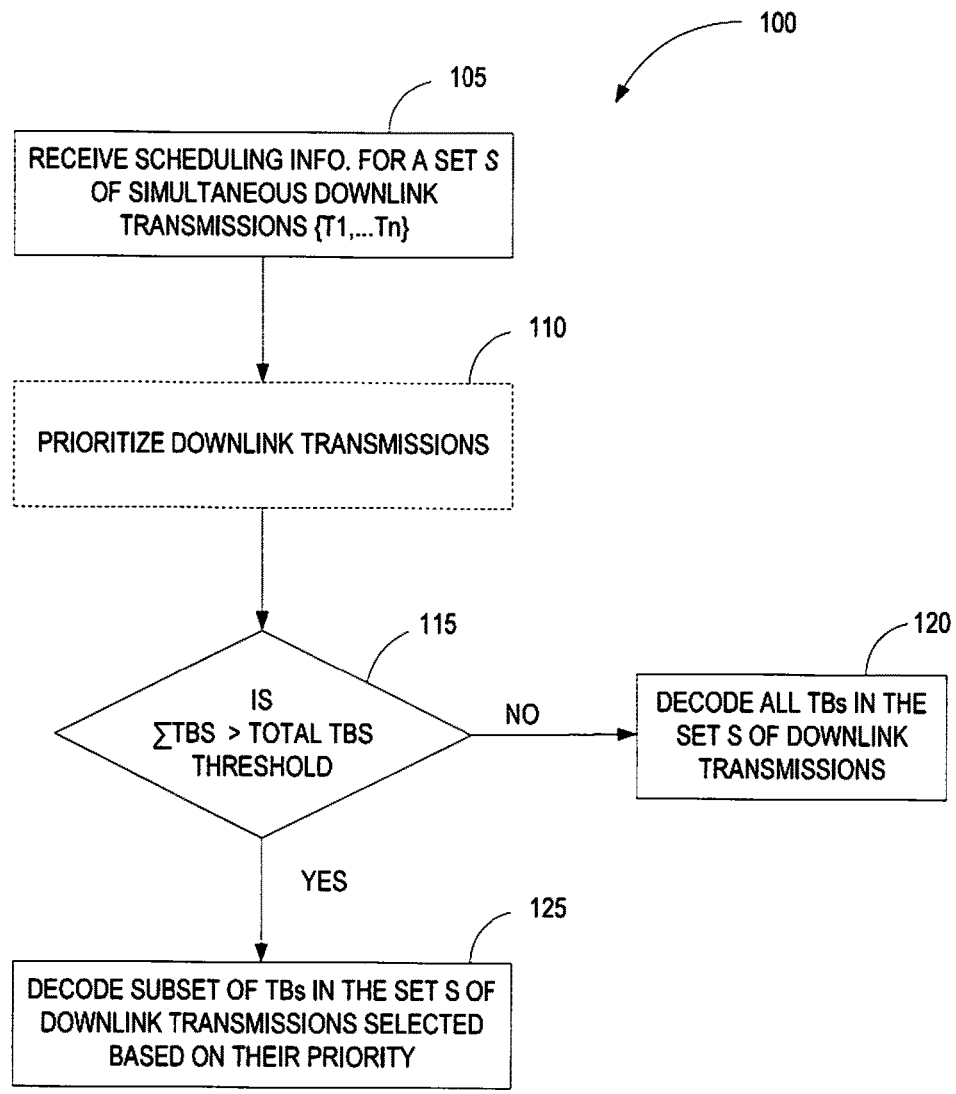
FIG. 3 illustrates an exemplary method implemented by a UE of decoding simultaneous downlink transmissions from a RBS.

FIG. 3 illustrates an exemplary method 100 of decoding simultaneous downlink transmission according to one embodiment. The UE 40 receives scheduling information for a scheduled set S of simultaneous downlink transmissions (T1, . . . Tn) (block 105). The scheduling information includes the TBS for each transport block in the set S of downlink transmissions. The UE 40 may optionally prioritize the downlink transmissions based on the received scheduling information (block 110). For example, the UE 40 may prioritize the transport blocks in the downlink transmissions based on the RNTIs. The UE 40 computes the sum of the TBSs for all transport blocks in the set S of downlink and compares the sum to a total TBS threshold for simultaneous downlink transmissions (block 115). If the sum of the TBSs does not exceed the threshold, the UE 40 decodes all of the transport blocks in the set S of downlink transmissions (block 120). If the sum of the TBSs exceeds the threshold, the UE 40 decodes a subset of the transport blocks selected based on a set of rules (block 125). The rules may, for example, comprise a set of prioritization rules that determine the priority of the transport blocks. The selected subset may be decoded in priority order, or in any random order.

Figure 4:
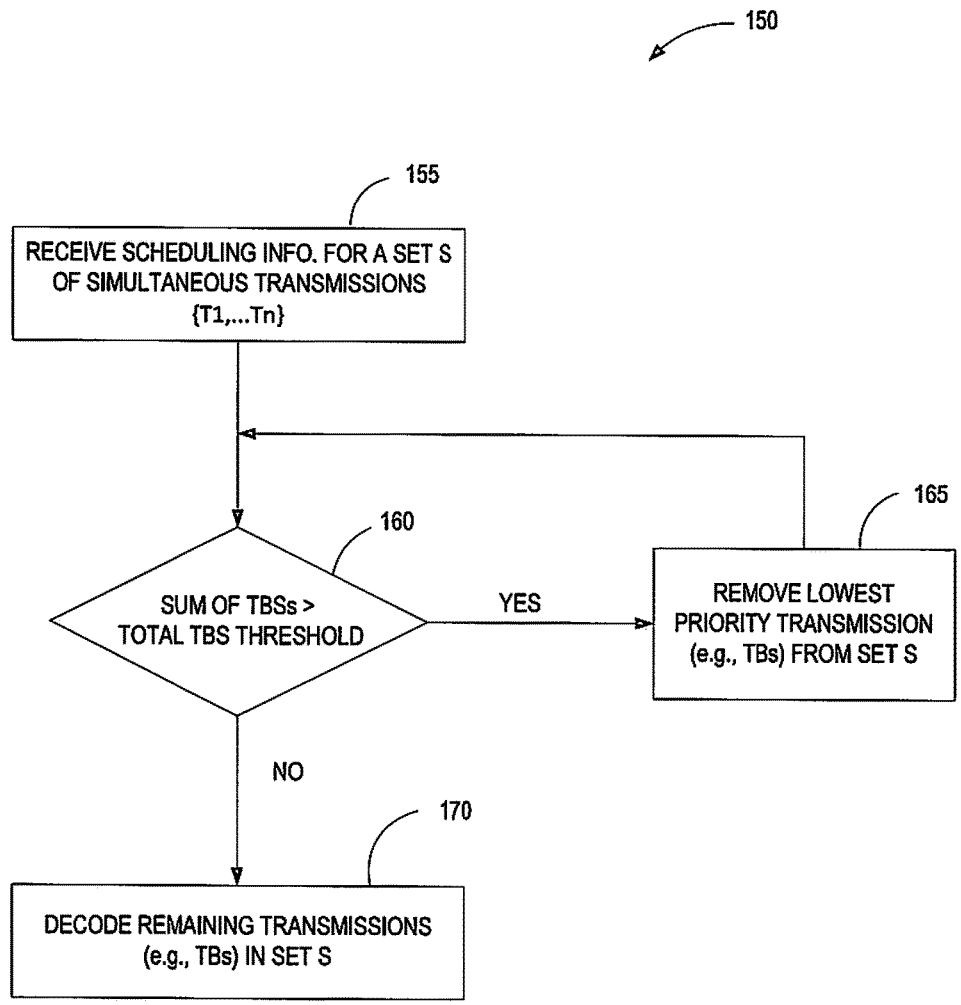
FIG. 4 illustrates an exemplary method performed by a low complexity UE of decoding simultaneous downlink transmissions from a RBS.

FIG. 4 illustrates an exemplary method 150 performed by a low complexity UE 40 of decoding simultaneous downlink transmissions. The UE 40 receives scheduling information for a scheduled set S of simultaneous downlink transmissions (T1, ... Tn) (block 155). The scheduling information includes the TBS for each transmission Ti in S. The UE 40 computes the sum of the TBSs for all simultaneous downlink transmissions in S and compares the sum to the total TBS threshold, e.g. 1000 bits (block 160). If the sum of the TBSs exceeds the threshold, the UE 40 removes one or more transport blocks of the lowest priority transmission from the set S, compares the sum of the TBSs in the revised set S to the threshold (block 165). This process is repeated until the sum of the TBSs is less than the threshold. The UE 40 then decodes the remaining transmissions in S. In this example, the remaining transmissions may be decoded in priority order, or in any random order (block 170).

Figure 5:
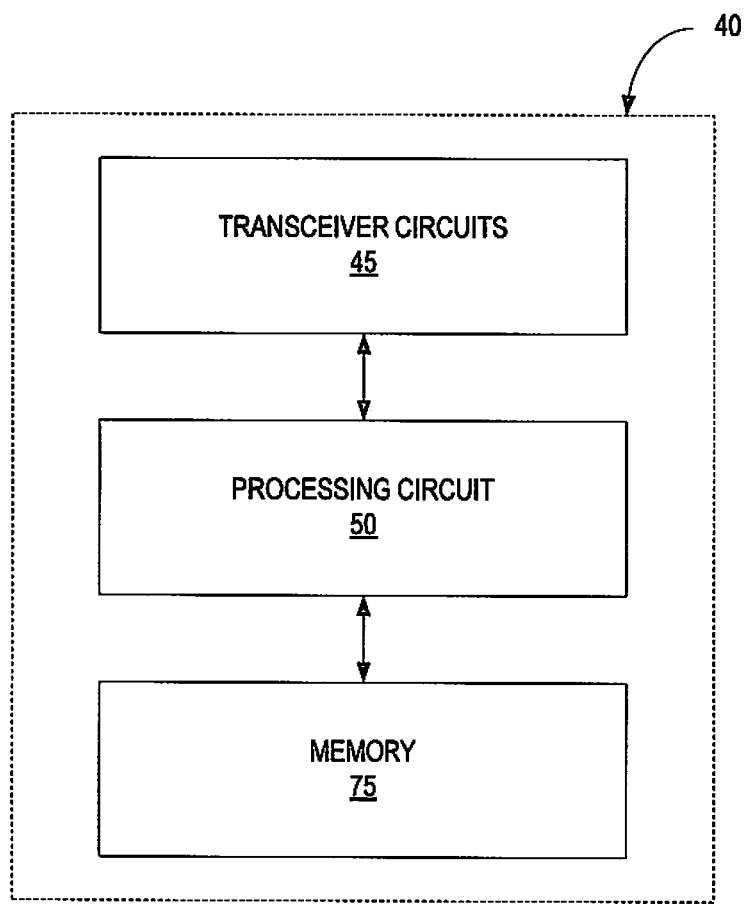
FIG. 5 illustrates a low complexity UE configured to receiving simultaneous downlink transmissions from a RBS.

FIG. 5 illustrates an exemplary low complexity UE 40 according to one embodiment. The UE 40 comprises transceiver circuits 45 for communicating over the wireless channel with RBS 20 in a wireless communication network 10, processing circuits 50 for processing information transmitted and received by the UE 40, and memory 75 for storing program code and data needed for operation. The transceiver circuits 45 may, for example, comprise transmitter circuits and receiver circuits that operate according to the LTE-Release 12 standard or other known standard. The processing circuits 50 may comprise one or more processors, hardware circuits, firmware, or a combination thereof. With regard to uplink transmissions, the processing circuits 50 perform coding and modulation of the information to be transmitted to generate the transmitted signals. With regard to downlink transmissions, the processing circuits 50 perform demodulation and decoding of the received radio signals. Memory 75 may comprise one or more volatile and/or non-volatile memory devices. Program code for controlling operation of the UE 40 is stored in a non-volatile memory, such as a read-only memory or flash memory. Temporary data generated during operation may be stored in random access memory. The program code stored in memory 75, when executed by the processing circuit 50, causes the processing circuit to perform the methods shown in FIGS. 2-4.

Figure 6:
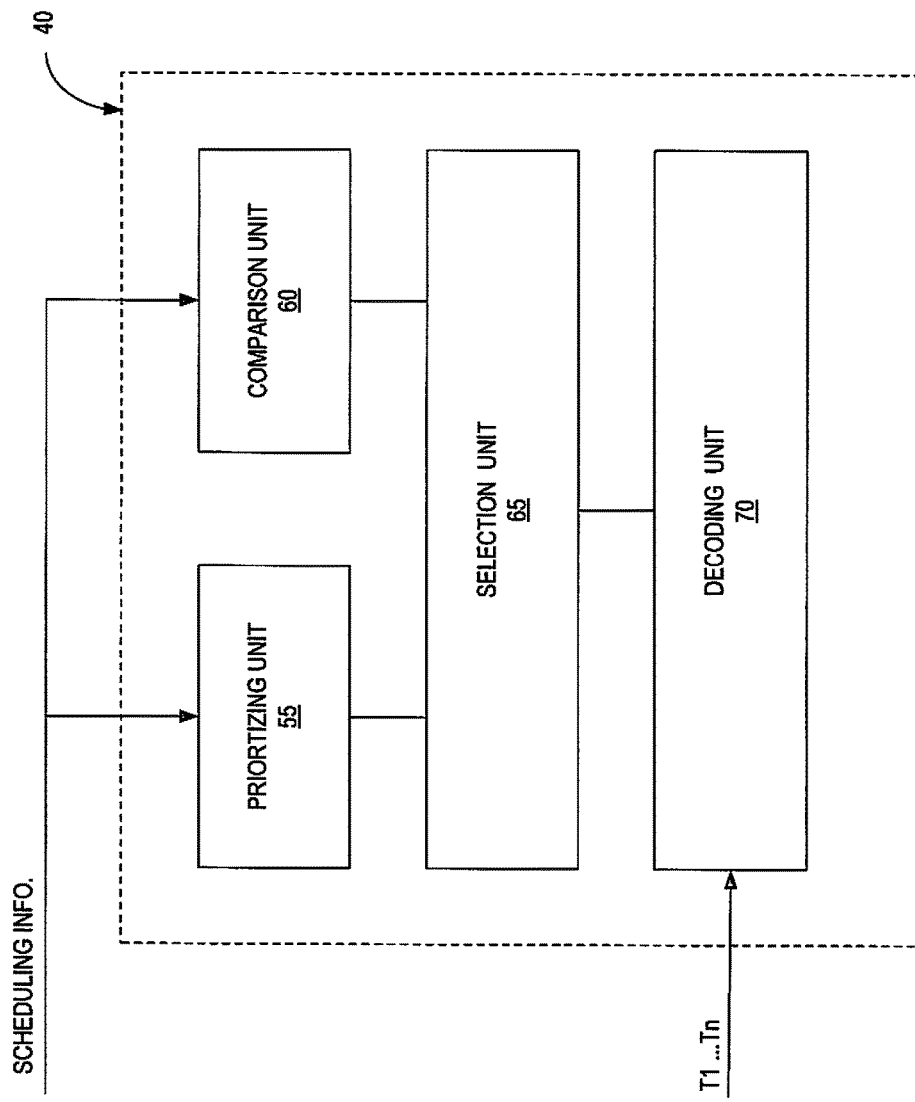
FIG. 6 illustrates the main functional elements if a processing circuit for a low-complexity UE.

FIG. 6 illustrates the main functional components of the processing circuit 50 according to one exemplary embodiment. The functional components include a prioritization unit 55, a comparison unit 60, a selection unit 65 and a decoding unit 70. In one embodiment, the prioritization unit 55, a comparison unit 60, a selection unit 65 and a decoding unit 70 each comprise a programmable circuit that is configured by program code stored in memory 75 to perform their respective functions. In other embodiments, one or more of the functional components may be implemented, in whole or in part, by hardware circuits. The prioritization nu it is configured to prioritize the downlink transmissions from the RBS to the UE 50. The comparison unit 60 is configured to compare the total TBS of all transport blocks in S to the total TBS threshold. The selection unit 65 is configured to select, responsive to an indication from the comparison unit 65, a subset of the transport blocks in S for decoding based on their priority as determined by the prioritization unit 55. The decoding unit 70 is configured to decode the selected transport blocks.

Figure 7:
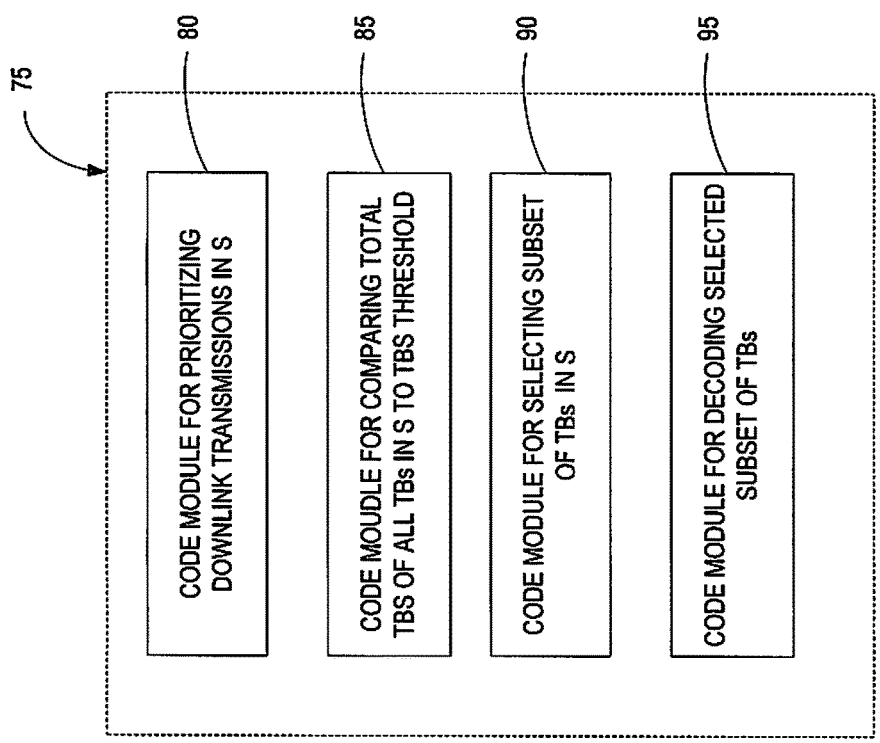
FIG. 7 illustrates a computer-readable medium storing program code for a low-complexity UE.

FIG. 7 illustrates a non-transitory computer readable medium, e.g., memory 75, with stored program code according to one exemplary embodiment. The memory 75 stores a code module 80 for prioritizing downlink transmissions, a code module 85 for comparing the total TBS of all transport blocks in S to the total TBS threshold, a code module 90 for selecting a subset of the transport blocks in S, and a code module 95 for decoding the selected transport blocks.

In another embodiment of the disclosure, the RBS 20 takes the TBS restrictions for the low complexity UE 40 in to account when scheduling and limits the transport block size in order to facilitate simultaneous reception with other transmissions in the same subframe. In some embodiments of the disclosure, the network may estimate how a UE 40 prioritizes different transmissions and, based on the estimate, schedule transmission to the UE 40. UEs 40 with different prioritization rules may be scheduled differently.

Figure 8:
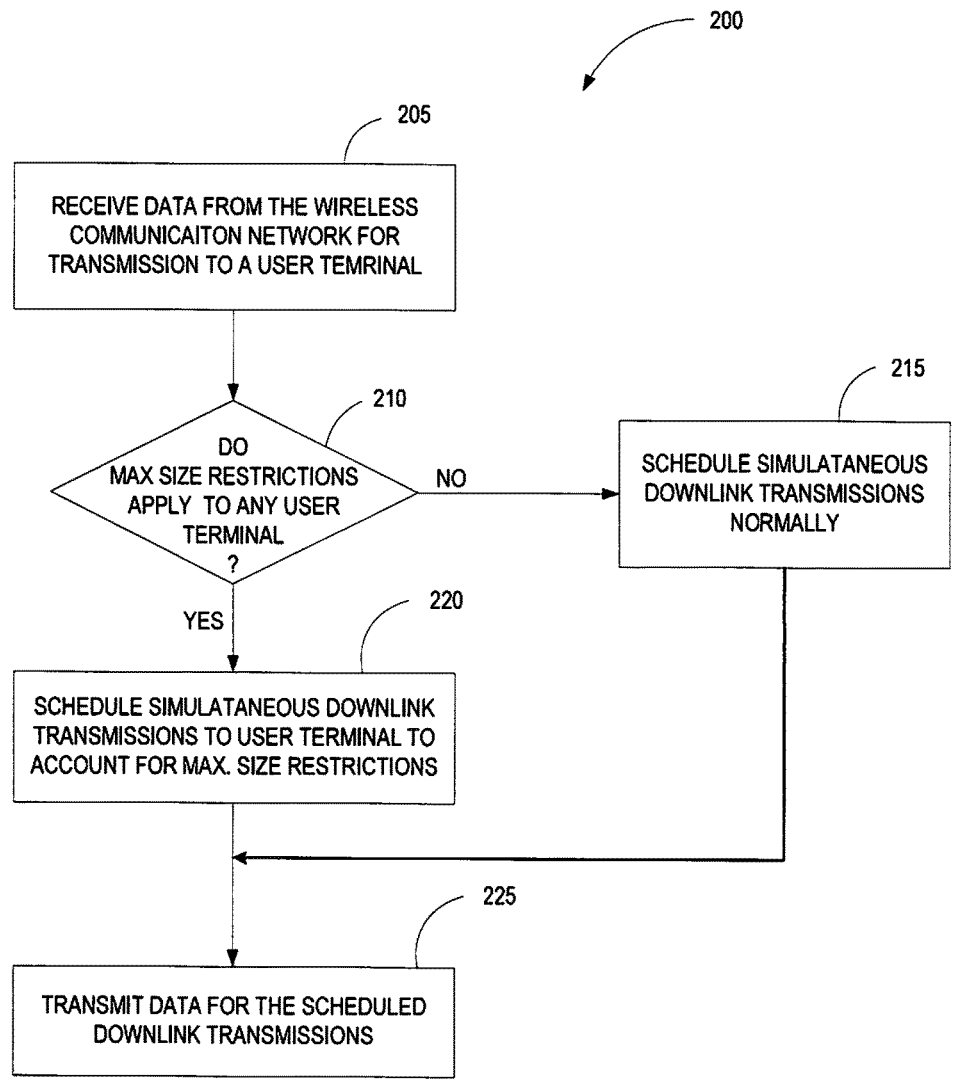
FIG. 8 illustrates an exemplary method performed by a network node or radio base station for transmitting data to a low complexity user terminal.

FIG. 8 illustrates an exemplary method 200 performed by a RBS 20. The RBS 20 optionally receives data from a core network to be transmitted to one or more UEs 40 (block 205). The TBS 20 may also generate data, e.g. control information, for transmission to the UEs 40. The RBS 20 determines whether TBS restrictions apply to any UEs 40 to be scheduled (block 210). If not, the RBS 20 schedules the transmissions normally (block 215). If so, the RBS 20 schedules the transmission to the UEs 40 taking into account the applicable UE prioritization rules to avoid exceeding the TBS restrictions (block 220). It is presumed that the RBS 20 has knowledge of the prioritization rules. For example, the prioritization rules may be standardized for different UE types. Also, the prioritization rules could be signaled to the RBS 20 by the UE 40 or by another network node. In one embodiment, the RBS 20 takes the TBS restriction into account only in case of particularly important transmissions, and relies on the UE 40 prioritization for other downlink transmissions. The RBS 20 then transmits the data corresponding for the scheduled downlink transmission to the UE 40 (block 225).

Figure 9:
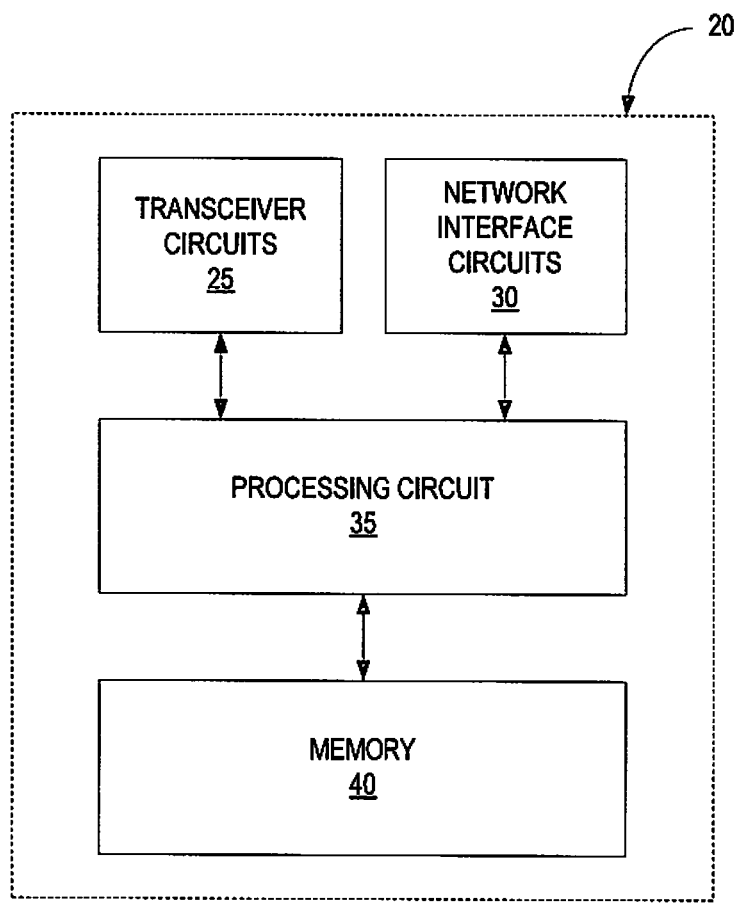
FIG. 9 illustrates a network node for transmitting data to a low complexity user terminal.

FIG. 9 illustrates an exemplary RBS 20 according to one embodiment. The RBS 20 comprises transceiver circuits 25 for communicating over the wireless channel with UEs 40, network interface circuits 30 for connecting to a core network and communicating with network nodes in the core network, processing circuits 35 for processing information transmitted and received by the RBS 20, and memory 36 for storing program code and data needed for operation. The transceiver circuits 25 may comprise transmitter circuits and receiver circuits that operate according to the LTE-Release 12 standard or other known standard. The network interface circuits 30 may for example comprise an Ethernet interface or other known interface for communicating over an Internet Protocol (IP) network. The processing circuits 35 comprise one or more processors, hardware circuits, firmware, or a combination thereof. With regard to downlink transmissions, the processing circuits 35 perform coding and modulation to generate the transmitted signals. With regard to uplink transmissions, the processing circuits 35 perform demodulation and decoding of the received radio signals. Memory 36 may comprise one or more volatile and/or non-volatile memory devices. Program code for controlling operation of the UE 40 is stored in a non-volatile memory, such as a read-only memory or flash memory. Temporary data generated during operation may be stored in random access memory. The program code stored in memory includes, for example, code for performing the method shown in FIG. 8.

The disclosure provides a method and apparatus that allows simultaneous transmission in parallel on different physical channels, giving the network similar flexibility as for normal complexity UEs 40, while still respecting the limited capabilities of a low complexity UE 40. This allows the low-complexity UEs 40 to be designed with limited buffering and processing capabilities while still be able to operate in LTE networks.

What is claimed is:

1. A method implemented in a user equipment of receiving simultaneous downlink transmissions, the method comprising:
receiving scheduling information for a set of simultaneous downlink transmissions, said scheduling information comprising a transport block size for each downlink transmission in said set of simultaneous downlink transmissions;
determining whether a total transport block size of the downlink transmissions in the set of simultaneous downlink transmissions exceeds a total transport block size threshold; and
in response to determining that the total transport block size of the downlink transmissions in the set of simultaneous downlink transmissions exceeds the total transport block size threshold, decoding a subset of transport blocks in the set of simultaneous downlink transmissions selected according to a set of rules.

2. The method of claim 1, wherein decoding the subset of the transport blocks in the downlink transmissions comprises decoding a subset of transport blocks selected according to their priority as defined by a set of prioritization rules.

3. The method of claim 2, further comprising determining a priority of a first one of the downlink transmissions in the set of simultaneous downlink transmissions depending on a type of the downlink transmission.

4. The method of claim 3, wherein determining the priority of the first downlink transmission in the set of simultaneous downlink transmissions depending on the type of the first downlink transmission comprises determining a message type of the first downlink transmission based on a radio network temporary identifier associated with the first downlink transmission.

5. The method of claim 3, wherein determining the priority of the first downlink transmission in the set of simultaneous downlink transmissions depending on the type of the first downlink transmission further comprises:
determining a first priority level for the first downlink transmission if the first downlink transmission contains a system information message; and
determining a second priority level for the first downlink transmission if the first downlink transmission contains terminal-specific information messages.

6. The method of claim 1, further comprising determining a priority of a first downlink transmission in the set of simultaneous downlink transmissions depending on scheduling information.

7. The method of claim 6, wherein determining the priority of the first downlink transmission in the set of simultaneous downlink transmissions depending on the scheduling information comprises:
determining a system information scheduling window during which the first downlink transmission is scheduled; and
determining a priority level of the first downlink transmission depending on the system information scheduling window.

8. The method of claim 1, further comprising:
receiving an indication that a first downlink transmission in the set of simultaneous downlink transmissions contains system information; and
determining a priority of the first downlink transmission depending on whether the system information has changed.

9. The method of claim 1, further comprising determining the total transport block size threshold based on a number of the simultaneous downlink transmissions.

10. A user equipment in a wireless communication network, the user equipment comprising:
transceiver circuits configured to communicate with one or more radio base stations in the wireless communication network; and
a processing circuit operatively connected to the transceiver circuits and configured to:
receive scheduling information for a set of simultaneous downlink transmissions, said scheduling information comprising a transport block size for each downlink transmission in the set of simultaneous downlink transmissions;
determine whether a total transport block size of the downlink transmissions in the set of simultaneous downlink transmissions exceeds a total transport block size threshold; and
decode a subset of transport blocks in the set of simultaneous downlink transmissions selected according to a set of rules, in response to determining that the total transport block size of the transport blocks in the set of simultaneous downlink transmissions exceeds the total transport block size threshold.

11. The user equipment of claim 9, wherein, to decode the subset of the transport blocks in the downlink transmissions, the processing circuit is configured to decode a subset of transport blocks selected according to their priority as defined by a set of prioritization rules.

12. The user equipment of claim 11, wherein the processing circuit is further configured to determine a priority of a first one of the downlink transmissions in the set of simultaneous downlink transmissions depending on a type of the downlink transmission.

13. The user equipment of claim 12, wherein, to determine the priority of the first downlink transmission in the set of simultaneous downlink transmissions depending on the type of the first downlink transmission, the processing circuit is configured to determine a message type of the first downlink transmission based on a radio network temporary identifier associated with the first downlink transmission.

14. The user equipment of claim 12, wherein, to determine the priority of the first downlink transmission in the set of simultaneous downlink transmissions depending on the type of the first downlink transmission, the processing circuit is further configured to:

determine a first priority level for the first downlink transmission if the first downlink transmission contains a system information message; and determine a second priority level for the first downlink transmission if the first downlink transmission contains terminal-specific information messages.

15. The user equipment of claim 10, wherein the processing circuit is further configured to determine a priority of a first downlink transmission in the set of simultaneous downlink transmissions depending on scheduling information.

16. The user equipment of claim 15, wherein, to determine the priority of the first downlink transmission in the set of simultaneous downlink transmissions depending on the scheduling information, the processing circuit is configured to:

determine a system information scheduling window during which the first downlink transmission is scheduled; and determine a priority level of the first downlink transmission depending on the system information scheduling window.

17. The user equipment of claim 10, wherein the processing circuit is further configured to:

receive an indication that a first downlink transmission in the set of simultaneous downlink transmissions contains system information; and determine a priority of the first downlink transmission depending on whether the system information has changed.

18. The user equipment of claim 10, wherein the processing circuit is further configured to determine the total transport block size threshold based on a number of the simultaneous downlink transmissions.

* * * * *